(12) United States Patent
Palmer

(10) Patent No.: US 12,475,085 B2
(45) Date of Patent: *Nov. 18, 2025

(54) SYSTEMS AND METHODS FOR IN-PLACE RECORDS MANAGEMENT AND CONTENT LIFECYCLE MANAGEMENT

(71) Applicant: OPEN TEXT SA ULC, Halifax (CA)

(72) Inventor: Jody Hupton Palmer, Cambridge (CA)

(73) Assignee: Open Text SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/787,847

(22) Filed: Jul. 29, 2024

(65) Prior Publication Data

US 2024/0385996 A1 Nov. 21, 2024

Related U.S. Application Data

(63) Continuation of application No. 18/152,090, filed on Jan. 9, 2023, now Pat. No. 12,050,560, which is a continuation of application No. 17/001,629, filed on Aug. 24, 2020, now Pat. No. 11,550,761, which is a continuation of application No. 15/722,871, filed on Oct. 2, 2017, now Pat. No. 10,754,828, which is a continuation of application No. 13/939,946, filed on Jul. 11, 2013, now Pat. No. 9,798,737.

(60) Provisional application No. 61/719,645, filed on Oct. 29, 2012, provisional application No. 61/671,016, filed on Jul. 12, 2012.

(51) Int. Cl.
*G06F 16/18* (2019.01)
*G06F 16/185* (2019.01)
*G06F 16/25* (2019.01)

(52) U.S. Cl.
CPC ............ *G06F 16/185* (2019.01); *G06F 16/25* (2019.01); *G06F 16/256* (2019.01)

(58) Field of Classification Search
CPC ...................................................... G06F 16/185
USPC ........................................................ 707/715
See application file for complete search history.

(56) References Cited

U.S. PATENT DOCUMENTS

| | | | |
|---|---|---|---|
| 8,914,406 B1 * | 12/2014 | Haugsnes | G06F 9/45558 710/316 |
| 2007/0265944 A1 * | 11/2007 | Catahan | G06Q 30/04 705/30 |
| 2007/0271308 A1 * | 11/2007 | Bentley | G06F 16/93 |
| 2012/0296897 A1 * | 11/2012 | Xin-Jing | G06F 16/583 707/E17.016 |

* cited by examiner

*Primary Examiner* — Syling Yen
(74) *Attorney, Agent, or Firm* — Sprinkle IP Law Group

(57) ABSTRACT

An in-place information management system having a management application built on a common data model and configured for asynchronous query-based application of policies on content stored in the disparate data storage systems through a query interface which may be part of a set of integration services. The common data model may be configured based on common architectures of the disparate data storage systems. The query interface may be configured for running a query on a data storage system in response to a search request received by the management application from a records manager and for mapping semantically equivalent keys from disparate data storage systems to a key in the common data model. The query may define a set of records to be treated similarly according to corporate policy on content lifecycle and records compliance.

20 Claims, 12 Drawing Sheets

SYSTEMS AND METHODS FOR IN-PLACE RECORDS MANAGEMENT AND CONTENT LIFECYCLE MANAGEMENT

CROSS-REFERENCE TO RELATED APPLICATIONS

This is a continuation of, and claims a benefit of priority under 35 U.S.C. § 120 from, U.S. patent application Ser. No. 18/152,090, filed Jan. 9, 2023, issued as U.S. Pat. No. 12,050,560, entitled "SYSTEMS AND METHODS FOR IN-PLACE RECORDS MANAGEMENT AND CONTENT LIFECYCLE MANAGEMENT," which is a continuation of, and claims a benefit of priority under 35 U.S.C. § 120 from, U.S. patent application Ser. No. 17/001,629, filed Aug. 24, 2020, issued as U.S. Pat. No. 11,550,761, entitled "SYSTEMS AND METHODS FOR IN-PLACE RECORDS MANAGEMENT AND CONTENT LIFECYCLE MANAGEMENT," which is a continuation of, and claims a benefit of priority under 35 U.S.C. § 120 from, U.S. patent application Ser. No. 15/722,871, filed Oct. 2, 2017, issued as U.S. Pat. No. 10,754,828, entitled "SYSTEMS AND METHODS FOR IN-PLACE RECORDS MANAGEMENT AND CONTENT LIFECYCLE MANAGEMENT," which is a continuation of, and claims a benefit of priority under 35 U.S.C. § 120 from, U.S. patent application Ser. No. 13/939,946, filed Jul. 11, 2013, issued as U.S. Pat. No. 9,798,737, entitled "SYSTEMS AND METHODS FOR IN-PLACE RECORDS MANAGEMENT AND CONTENT LIFECYCLE MANAGEMENT," which claims a benefit of priority from Provisional Application No. 61/671,016, filed Jul. 12, 2012, entitled "SYSTEM AND METHOD FOR IN-PLACE RECORDS MANAGEMENT," and Provisional Application No. 61/719,645, filed Oct. 29, 2012, entitled "SYSTEM AND METHOD FOR IN-PLACE RECORDS MANAGEMENT." All applications listed in this paragraph are fully incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to records and information management. More particularly, embodiments disclosed herein relate to systems, methods, and computer program products for centralized "in-place" records management and/or lifecycle management of records and information stored in disparate data storage systems, including content servers, enterprise content repositories, and the like.

BACKGROUND OF THE RELATED ART

Records management (RM) refers to the practice of maintaining the records of an entity, enterprise, company, corporation, or organization (collectively referred to hereinafter as "organization") from the time they are created up to their eventual disposal. RM is primarily concerned with a record of an organization's activities. RM functions may include classifying, storing, securing, and destruction (or in some cases, archival preservation) of records. In recent years, compliance regulations and statutes such as the Sarbanes-Oxley Act have created concerns among organizations regarding RM practices. Ideally, RM should be flexible enough to adapt to both existing and ever-changing regulations, statutes, standards, and best practices, however, in practice and with these lofty goals in mind, sufficient and effective RM can be quite a challenge for many organizations to achieve.

The general principles of records management apply to records in any format. Digital records, however, can raise technical challenges that can have important implications for the authenticity, reliability, and trustworthiness of records. For example, it is more difficult to ensure that the content, context and structure of records is preserved and protected when the records do not have a physical existence or counterpart. Additionally, these records may reside in data storage systems employing different architectures and/or having various levels of sophistication in lifecycle management, if any at all.

A record's lifecycle consists of discrete phases covering the lifespan of the record from its creation and inception to its final disposition and deletion. Once a record is created in an organization, controls may be set by its owner, a records repository, or an authorized user to regulate its access and distribution. For example, an administrator may set role privileges on a repository allowing users having certain roles access to particular records stored in the repository. Software such as lifecycle management systems and/or records management systems may identify the original record, versions of the record, copies of the record, and distribution of the record. Maintenance of the record may be carried out in many ways. For example, records may be formally and discretely identified by coding and stored in folders specifically designed for protection and storage capacity, or they may be informally identified and filed without indexing.

In an organization, those who are responsible for such software systems may be referred to as records managers. Records managers are charged in controlling and safeguarding the records of the organization and often use lifecycle management systems and/or records management systems to manage the creation, access, distribution, storage, and disposition of records in compliance with laws and regulations governing RM practices.

FIG. 1 offers a glance into the complex world in which a records manager operates. As illustrated in FIG. 1, records and information 90a-e owned by organization 100 may reside in various data storage systems 80a-e. This is due in part because the creation of such records and information may occur in response to different needs and/or organizational processes. Moreover, the control of organizational records and information is often distributed across departments and locations within an organization.

Additionally, these data storage systems may run on different platforms and utilize different architectures to store records. Consequently, records manager 10 may need to utilize separate software systems such as records management systems 30b, 30c, 30d, and lifecycle management systems 40a, 40b, 40e to enforce corporate policy 20 on content lifecycle and records compliance. For example, records manager 10 may use records management systems 30b, 30c, 30d to perform records management tasks on records/documents/files 90b, 90c, 90d stored on enterprise content repository 80b, file share 80c, and laptop 80d, respectively, and use lifecycle management systems 40a, 40b, 40e to perform lifecycle management tasks on records/ documents/files 90*a,* 90*b,* and 90*e* stored on content server 80*a,* enterprise content repository 80*b,* and mobile device 80*e,* respectively.

It can be seen from FIG. 1, records manager 10 may perform these tasks in an ad hoc, sporadic, disjointed, and brute force manner as each lifecycle or records management system may be specific to a certain data storage system and may not be used to manage records and information stored on other data storage systems in the organization and so records manager 10 needs to address, control, and update each system separately.

Furthermore, as exemplified in FIG. 1, records manager 10 often would need to understand multiple records management and/or lifecycle management systems and know how to use them in order to manage records and information for an organization. As the organization continues to create records, data storage systems and machines employing new storage architectures and/or technologies may be acquired and used to store its records and information, adding new challenges and further pitfalls to records managers.

SUMMARY OF THE DISCLOSURE

Embodiments disclosed herein provide inventive systems, methods, and computer program products and describe inventive techniques and approaches for centralized "in-place" records management and/or content lifecycle management.

In some embodiments, an in-place information management system may be implemented on one or more computers at least occasionally communicatively connected to disparate data storage systems over a network. Examples of disparate data storage systems may include content servers, enterprise content repositories, file share systems, laptop computers, mobile devices, and the like. The in-place information management system may include a management application, a common data model, and a query interface.

The management application may be built on the common data model and configured for asynchronous query-based application of policies on content stored in the disparate data storage systems. The common data model may be configured based on common architectures of the disparate data storage systems. The query interface, which may be a part of integration services according to one embodiment, may be configured for running a query on a data storage system such as a content server in response to a search request received by the management application from a records manager. The records manager may interact with the management application via a user interface running on a client device communicatively connected to the in-place information management system.

The queried data storage system may identify a set of records that match the query and returns identification information corresponding to the set of records to the query interface. The query interface may operate to translate the identification information corresponding to the set of records into a translated format utilizing the common data model. The management application may return the identification information corresponding to the set of records in the translated format to the records manager.

The management application may be further configured to allow the records manager to define a policy that is effective across all the content stored in the disparate data storage systems. Additionally, the management application may be configured for placing an in-place hold on the set of records. The in-place information management system may support in-place lifecycle control, in-place records management, or a combination thereof, over content stored in the disparate data storage systems. For data storage systems controlled by the in-place information management system, in-place holds are supported. For others, lifecycle management is supported. Further, "copy on hold" may also be supported. Optionally, data can be moved from a lifecycle managed data storage system to a records managed data storage system where the data can be certified as meeting RM rules (referred to as "RM guaranteed"). The in-place information management system may not have control over these disparate data storage systems as they may be independently owned.

Embodiments can be implemented as hardware, software programming or some combination. Embodiments can be implemented as computer instructions stored on any appropriate non-transitory computer readable medium known in the art.

Embodiments disclosed herein can provide many advantages over the conventional art. For example, records do not need to be moved or pulled into a single source; rather, records can be managed "in place" where they are stored. Another advantage is that embodiments can query metadata on remotely connected data storage systems, asynchronously and across platforms. For example, an organizational policy on content lifecycle and records compliance can be expressed as a classification of queries over metadata on target data storage systems. In this way, data can be structured, organized and applied in a data storage system independent of how records managers develop their own classifications over the data. This has the advantage of applying organizational policies on records throughout disparate/independent data storage systems and platforms, while allowing for independent local records management to develop and deploy particular needed or desired policies. Furthermore, embodiments do not require changing code in native applications.

Embodiments disclosed herein can also allow a reduced or minimized, more manageable number of nodes to be classified by records managers. Each node can be associated with a set of documents on a data storage system. To this end, embodiments allow for a one-to-many relationship of one query to many records. This can enable a range of metadata querying, including specifying a single document in a query or a set of documents which have certain characteristics. This allows for flexible expression of policy and effective query-based application of policy over all the records that are owned by an organization and that are stored in disparate data storage systems. An added benefit is that records managers no longer need to understand multiple different records management systems and lifecycle management systems.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
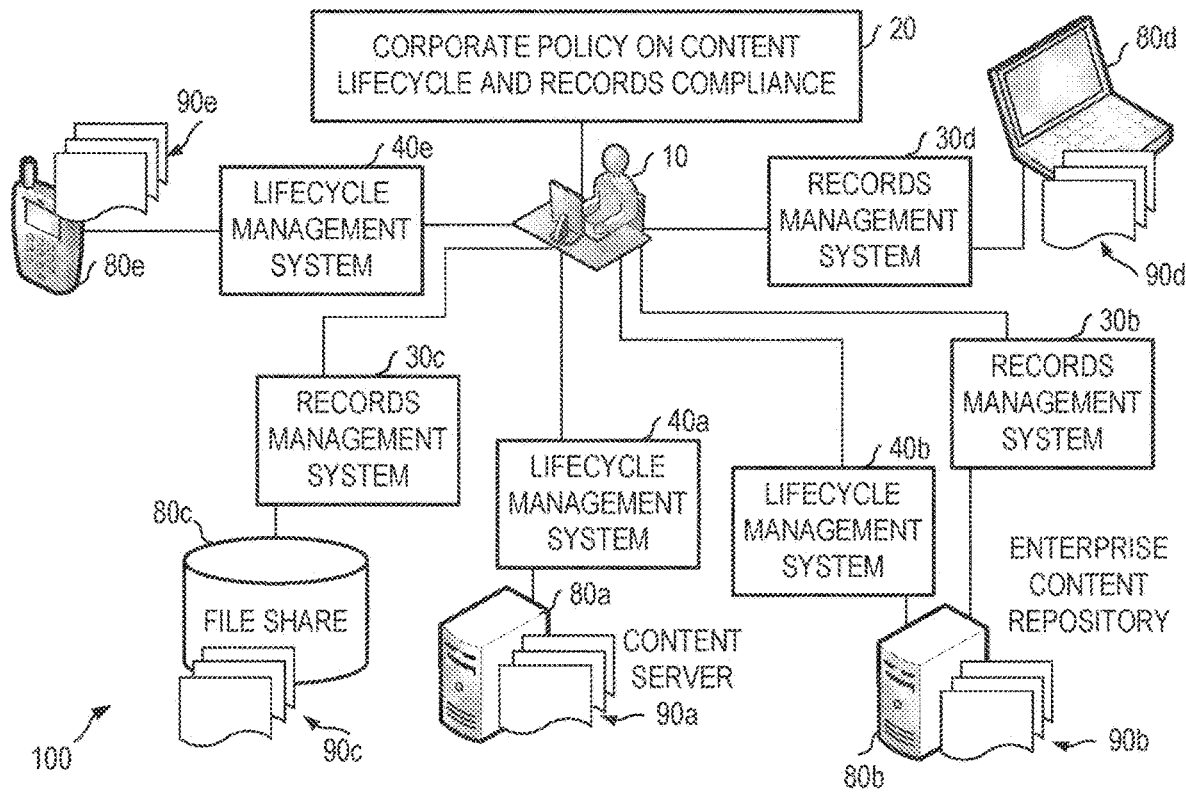
FIG. 1 depicts a diagrammatic representation of a prior art computing environment in which a records manager operates.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Embodiments disclosed herein can be useful for governing the content of systems owned and/or newly acquired by an organization. Particularly, an object of the invention is to provide a central place for records managers to define policies which are effective across all the data in their different data storage systems, thereby allowing an organization to enforce records management as well as lifecycle management policies across multiple platforms without interfering (or minimally interfering) with content and/or system usage. This object can be realized in an in-place information management system configured for centralized records management and centralized lifecycle management over records and information stored in disparate data storage systems.

A distinction between "records management (RM)" and "lifecycle management (LM)" may pertain to the level of trust one has in a data storage system's ability to comply with content access and modification restrictions. RM has governance rules that must be met in order to be certified for compliance. LM may utilize the same policies, same records maintenance schedules, and same RM/LM definitions, although no certification of compliance is provided or guaranteed.

Embodiments of an in-place information management system, method, and computer program product (hereinafter referred to as the "system") can be configured to support both RM and LM in a distinctly "in-place" manner as records and information are not moved or pulled from locations where they actually reside (and moved or pushed back to such locations). Additionally, for records that are owned by an organization and that reside in a repository controlled by the system (which may be implemented on one or more computers), the records can be RM guaranteed by the system. If the records reside elsewhere in the organization, for instance, in a proprietary enterprise content repository that is not under the system's control, the system can still orchestrate the records and manage the records "in-place" for the organization, utilizing the same policies, same schedules, and same definitions, and can, in some embodiments, provide an option to get the records RM guaranteed by allowing the records to be moved to a hold repository. This can be useful should there be a need to place a legal hold on the records. This feature is further described below in detail.

The system provides a central place for a records manager of an organization to define policies which are effective across all the data (including records and information owned by the organization) in their multiple different data storage systems. This is done through acting on the results of queries on those different data storage systems, rather than forcing synchronization of metadata across those different data storage systems. Acting on the results of queries can be done in an asynchronous manner so that the system can loosely couple with those different data storage systems in their performance and their availability. This allows the system to support highly reliable systems as well as less reliable systems and permits fault tolerance. Furthermore, the system uses a common data model so that the records manager only has one data model to understand, despite all the many disparate data storage systems where the records and information may reside.

Before describing embodiments of the system in detail, it may be helpful to provide an example data processing system architecture on which the system can be built.

Figure 2:
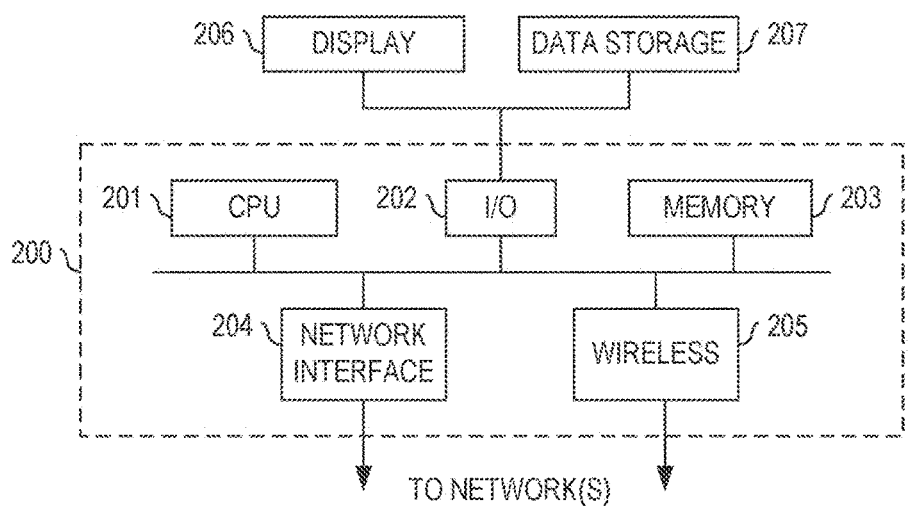
FIG. 2 depicts a diagrammatic representation of an example hardware architecture for a data processing system implementing an embodiment disclosed herein.

As shown in FIG. 2, data processing system 200 may include one or more central processing units (CPUs) or processors 201 coupled to one or more user input/output (I/O) devices 202 and memory devices 203. Examples of I/O devices 202 may include, but are not limited to, keyboards, displays, touch screens, mice, pointing devices, etc. Examples of memory devices 203 may include, but are not limited to, magnetic disk drives, optical disk drives, magnetic cassettes, tape drives, flash memory cards, random access memories (RAMs), read-only memories (ROMs), smart cards, etc. Data processing system 200 can be coupled to display 206, data storage device 207, and various peripheral devices (not shown), such as printers, plotters, speakers, etc. through I/O devices 202. Data processing system 200 may also be coupled to external computers or other devices through network interface 204, wireless transceiver 205, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. Instructions implementing such functions may, for example, be stored or distributed on one or more non-transitory computer-readable media, hardware circuitry, or the like, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Such instructions may be translatable by one or more server machines on which the system is run. Examples of a non-transitory computer readable medium are provided below in this disclosure.

Embodiments and aspects of the system will now be described in further details below.

Figure 3:
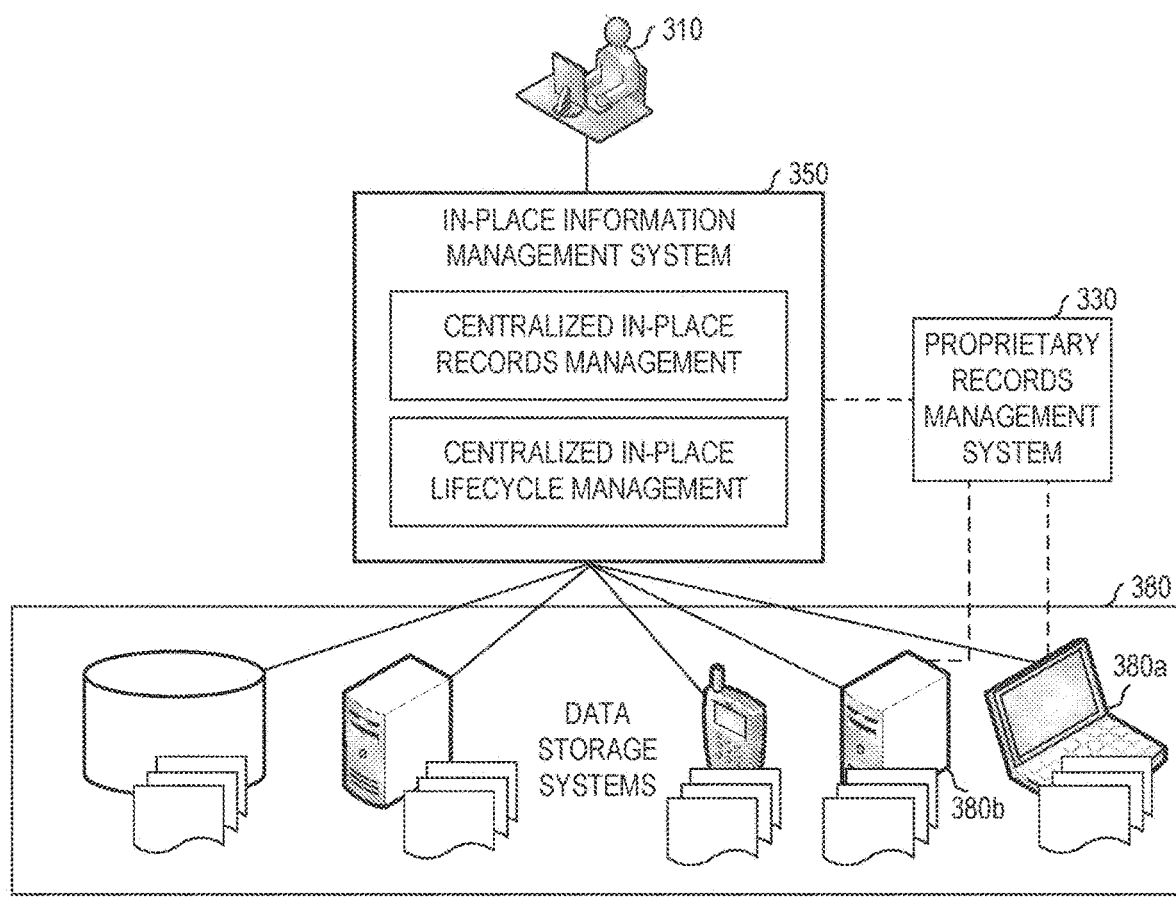
FIG. 3 depicts a diagrammatical representation of one embodiment of an in-place information management system.

FIG. 3 depicts a diagrammatical representation of a high level architecture of one embodiment of an in-place information management system (e.g., system 350) configured for centralized records management and centralized lifecycle management of content (e.g., records, documents, files, objects, items, etc., which may be referred to hereinafter as "records" for the sake of brevity) stored in multiple disparate data storage systems (e.g., data storage systems 380) communicatively connected to system 350. Data storage systems 380 may reside at physical locations that are remote to system 350 and may be separately connected to system 350 via network connections. Records manager 310 may utilize system 350 to define a policy applicable to a set of records residing in one of data storage systems 380 without having to move the set of records.

Embodiments of the system disclosed herein can function over native applications (third party products). For example, in some embodiments, system 350 may be implemented as an extension to proprietary records management system 330, allowing proprietary records management system 330 to retain control over data storage systems 380a-b while still providing records manager 310 a centralized place and tools to perform lifecycle management over content stored in data storage systems 380a-b.

Embodiments of the system disclosed herein can support both a records manager's current way of working with the content in their products and their organization's interest in controlling disposition and access, providing transparency into and control over the content. The system can reach out, asynchronously, to all of the content in the enterprise and be the one place to set and apply policies on content lifecycle and records compliance.

Figure 4:
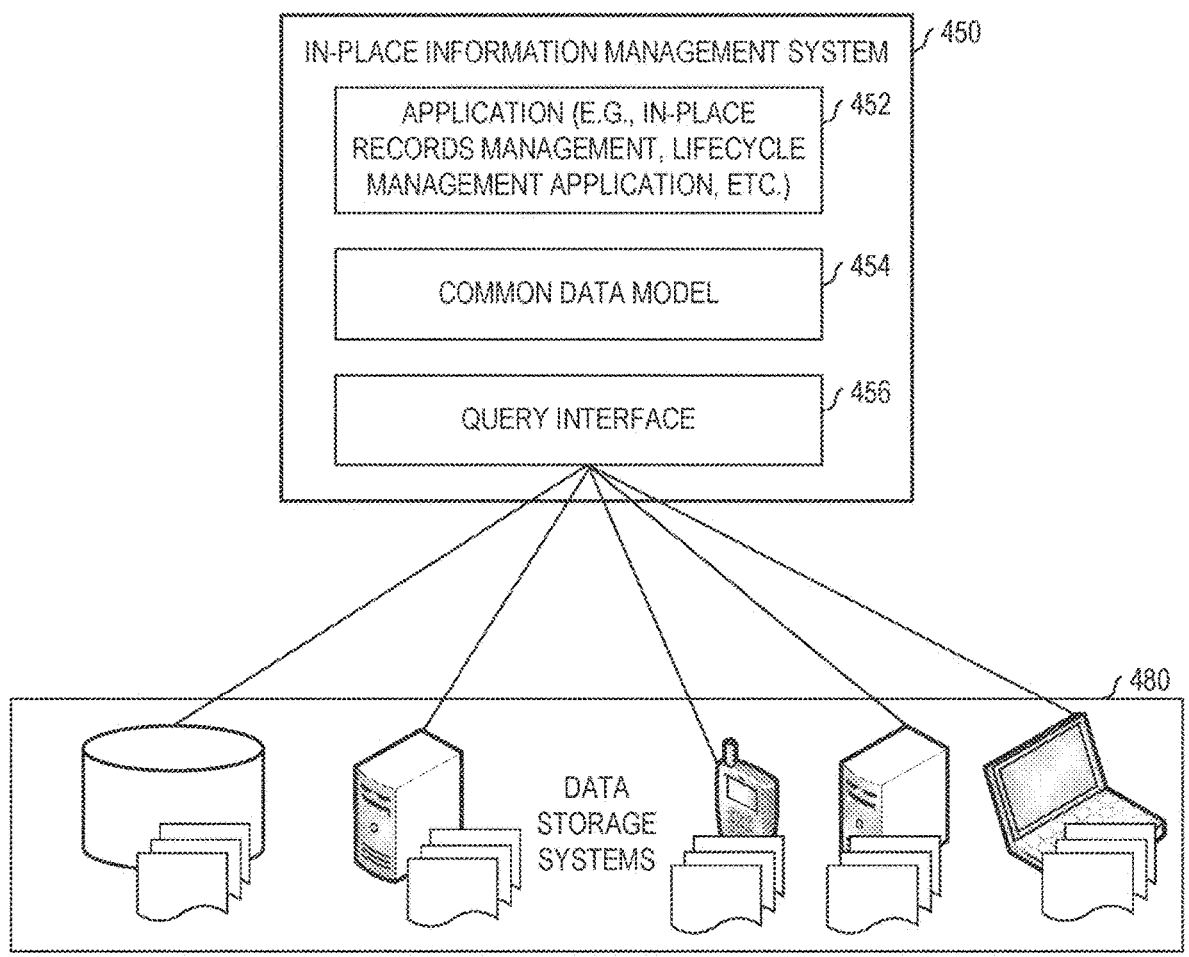
FIG. 4 depicts a diagrammatic representation of another embodiment of an in-place information management system.

FIG. 4 depicts a diagrammatic representation of another embodiment of an in-place information management system. In this example, system 450 may be implemented on a server computer communicatively connected to multiple disparate data storage systems 480 over a network. System 450 may include management application 452, common data model 454, and query interface 456.

Management application 452 may be configured for asynchronous query-based application of policies on content stored in disparate data storage systems 480. Management application 452 may be built on common data model 454. In one embodiment, management application 452 can be an extension of an existing records management application (e.g., proprietary records management system 330 shown in FIG. 3) such that management application 452 does not compete with the existing records management application, but rather augments it.

In one embodiment, system 450 can query remote data storage systems 480 such as a content server or enterprise content repository, rather than synchronizing metadata with those systems. To this end, query interface 456 may be configured for dynamically translating query languages and command structures utilizing common data model 454.

Common data model 454 may be configured based on common architectures of disparate data storage systems 480. An example of a suitable common data model is further described below. In some embodiments, system 450 may support a set of data models.

Common data model 454 can provide a records manager with the ability to map one policy to many records stored at one or more data storage systems. For example, the records manager may use the management application to define (via criteria and/or metadata) a set of records that are to be treated similarly according to an RM policy. The records manager can query a data storage system to identify the set of records (using the criteria and/or metadata thus defined) and associate the set of records with an RM classification that complies with the RM policy, thereby mapping the RM policy to the set of records. System components that enable these abilities are described below with reference to FIGS. 5A and 5B. Specifically, FIGS. 5A and 5B depict diagrammatical representations of functional blocks of one embodiment of in-place information management system components.

Figure 5A:
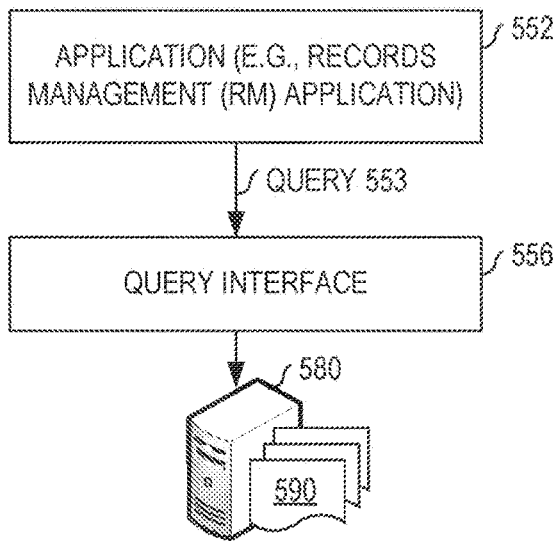
FIGS. 5A and 5B depict diagrammatical representations of functional blocks of one embodiment of in-place information management system components.
Figure 5B:
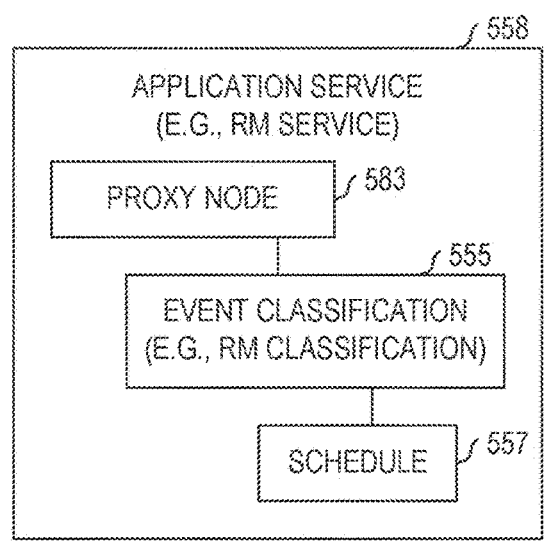

As illustrated in FIG. 5A, in response to a search request from a records manager using RM application 552 (which may be one embodiment of application 452 described above), RM application 552 may send query 553 in a common data model format (on top of which RM application 552 is built) to query interface 556. Query interface 556

(which may be one embodiment of query interface 456 described above) may be configured to translate or otherwise interpret query 553 into a request in an appropriate (translated) format for data storage system 580 so that data storage system 580 can process the request accordingly and identify records 590 as matching criteria and/or metadata in query 553. In one embodiment, data storage system 580 may include a remote query interface configured to receive such a request from query interface 556 and return, in the example of FIG. 5A, identification information (e.g., record identifiers) corresponding to records 590. Based on such identification information and criteria and/or metadata in query 553, records 590 can be represented in proxy node 583, as shown in FIG. 5B.

The records manager can associate records 590 (represented in proxy node 583) with event classification 555 that complies with a particular RM policy, thereby mapping the RM policy to records 590. In some embodiments, the system can support both manual classification of sets of documents, and external automatic classification of documents, utilizing software tools configured to assist in classifying large numbers of documents.

According to their RM policy, records 590 are to be treated similarly. As a specific example, in one embodiment, this can be accomplished by associating records 590 with schedule 557 (e.g., a Record Series Identifier (RSI) schedule) that defines a lifecycle of records 590. In one embodiment, the above-described features can be provided to the records manager via application service 558 associated with application 552.

In one embodiment, mapping a policy to a set of records can occur dynamically. In one embodiment, the mapping can occur asynchronously, regardless of whether the system is communicatively connected to the data storage system. That is, the system can implement asynchronous communications with data storage systems. This asynchronous feature, referred to hereinafter as asynchronous messaging, provides the system with the ability to perform records management for occasionally connected computers/systems, extending control to these systems. Examples of such occasionally connected systems may include, but are not limited to, laptop computers and mobile devices.

Accordingly, when a query is made to a data storage system, the system might not be communicatively connected to that data storage system (e.g., the data storage system may be off-line). In one embodiment, the system may hold the query and wait for the data storage system to be back on-line before processing the query.

Accordingly, the system can be configured to allow an initial search for records to be performed asynchronously. In some embodiments, an approval can be required to implement a policy. In such cases, the system can be configured to implement policies and actions asynchronously after the approval process. Thus, in some embodiments, the system can be configured to allow an initial search to be performed asynchronously. A set of records from such a search can then be represented in the system as a proxy node. Policies and actions can be implemented asynchronously utilizing the proxy node after an approval process.

Figure 6:
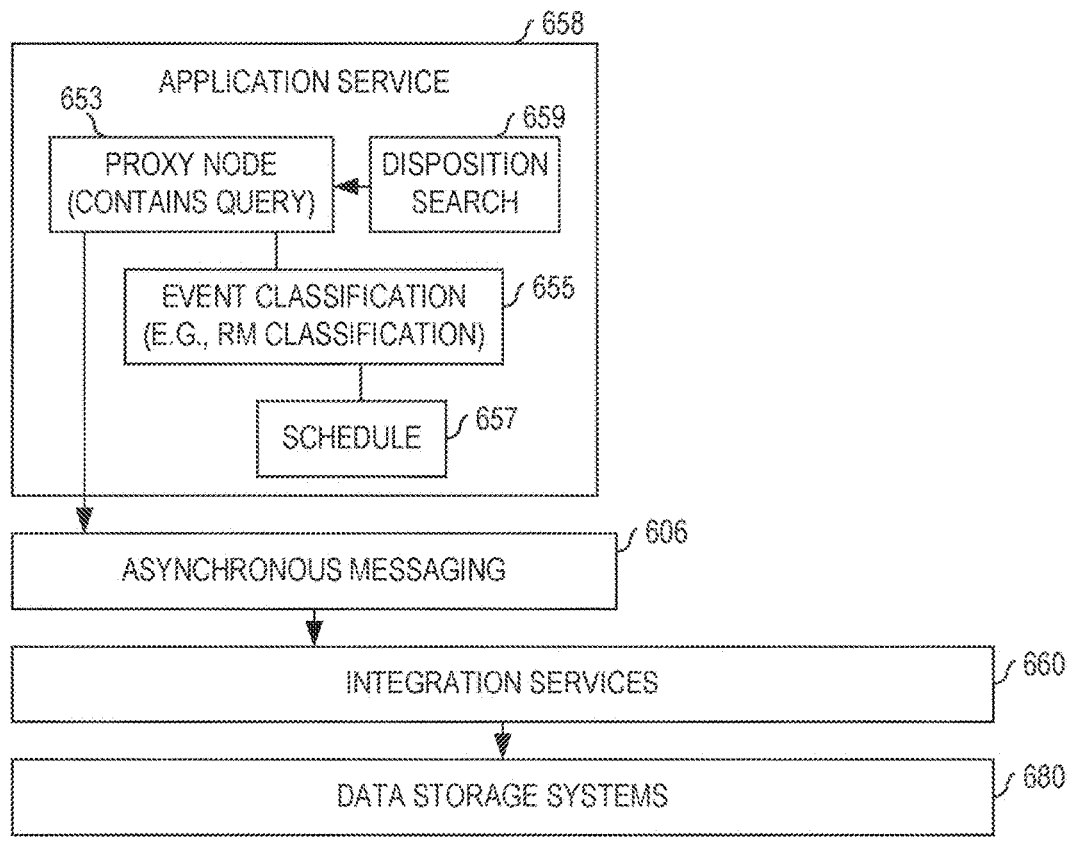
FIG. 6 depicts a flow diagram illustrating an example query-based application of policy via asynchronous communications with data storage systems.

FIG. 6 depicts a flow diagram illustrating an example query-based application of policy via asynchronous communications with data storage systems.

In this example, a set of records queried from data storage systems 680 may be represented by proxy node 653 and associated with event classification 655. Through the association with event classification 655, the set of records can be associated with schedule 657 which defines the lifecycle of the set of records.

To manage the lifecycle of the set of records represented by proxy node 653 according to schedule 657, disposition search 659 can be created by a records manager using application service 658 (which may be one embodiment of application service 558 described above). In one embodiment, the above-described actions can leverage the functionality of an existing RM application (e.g., proprietary records management 330 shown in FIG. 3).

In one embodiment, a disposition search can be done by using a proxy node that has a one-to-many relationship with multiple data storage systems. As described above, a proxy node may represent to the system a set of records for management. Accordingly, a disposition search may include locating a proxy node (e.g., an RM or LM proxy node) based on an event classification (e.g., an RM classification) and/or categories and attributes and locating a set of records by executing a query on the data storage system. The above-described asynchronous messaging (e.g., asynchronous messaging 606) can allow the disposition search to continue even if the data storage system is or becomes slow. In the example of FIG. 6, the functionality of a query interface described above (e.g., query interface 556 shown in FIG. 5) is embodied in integration services 660.

As one skilled in the art can appreciate, there can be many types of disposition actions. Example disposition actions may include deleting a record or a set of records, changing permissions on a record or a set of records, putting a record or a set of records on hold, and so on.

How record(s) can be held and where may depend on whether the system has control over data storage system(s) where the record(s) is/are stored. Some data storage systems may be controlled by the system. For those, the system supports in-place holds (holding the record(s) in their place without moving them to another location). For example, the system may hold litigation documents and prevent them from being destroyed for any reason until the associated litigation is finished, thereby holding those litigation documents "in-place" where they reside.

For other data storage systems that are not thus controlled (e.g., data storage systems 380*a*-*b* shown in FIG. 3 are controlled by proprietary records management system 330), the system may not guarantee in-place holds, but can nevertheless provide lifecycle management over content stored in such data storage systems. In one embodiment, these two classes of data storage systems (those controlled by the system and those that are not) may be referred to as "records managed data storage systems" and "lifecycle managed data storage systems," respectively.

Figure 7:
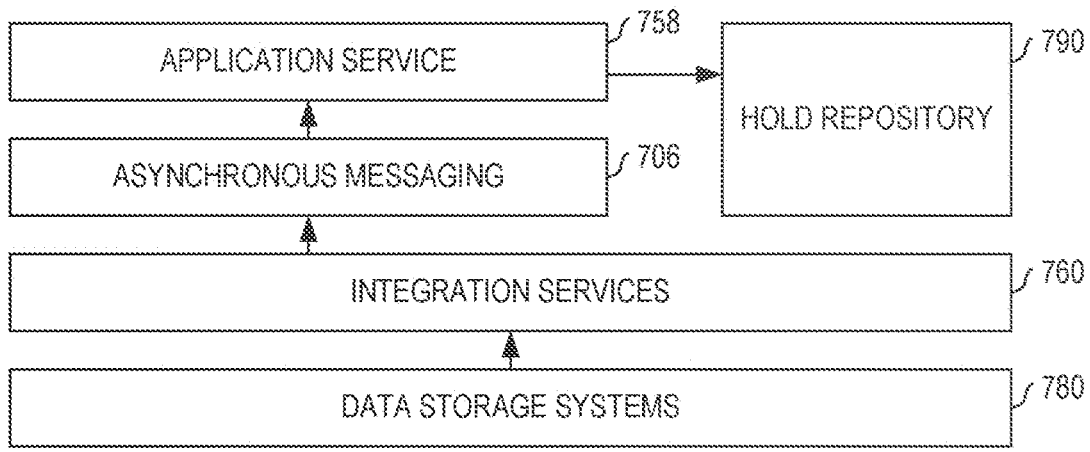
FIG. 7 depicts a diagrammatic representation of an embodiment of an in-place information management system having a hold repository.

Referring to FIG. 7, for data storage systems which do not support in-place holds, the system may hold content (e.g., a record from data storage systems 780) by copying into a hold repository (e.g., hold repository 790 shown in FIG. 7). This process (which may be performed by application service 758 utilizing asynchronous messaging 706 and integration services 760) may be referred to as "copy on hold". Application service 758 may be one embodiment of application service 658 described above. Asynchronous messaging 706 may be one embodiment of asynchronous messaging 606 described above. Integration services 760 may be one embodiment of integration services 660 described above.

In one embodiment, the system may perform "copy on hold" by copying a document into a hold repository to guarantee that the document will not be deleted until the hold is released. In this case, the hold repository can serve as a content server with RM. To this end, the ability for the system to perform "copy on hold" essentially provides the reuse of a certified RM platform.

Those skilled in the art will appreciate that embodiments of the system described above can be implemented in various ways. Several examples will now be described.

Figure 8:
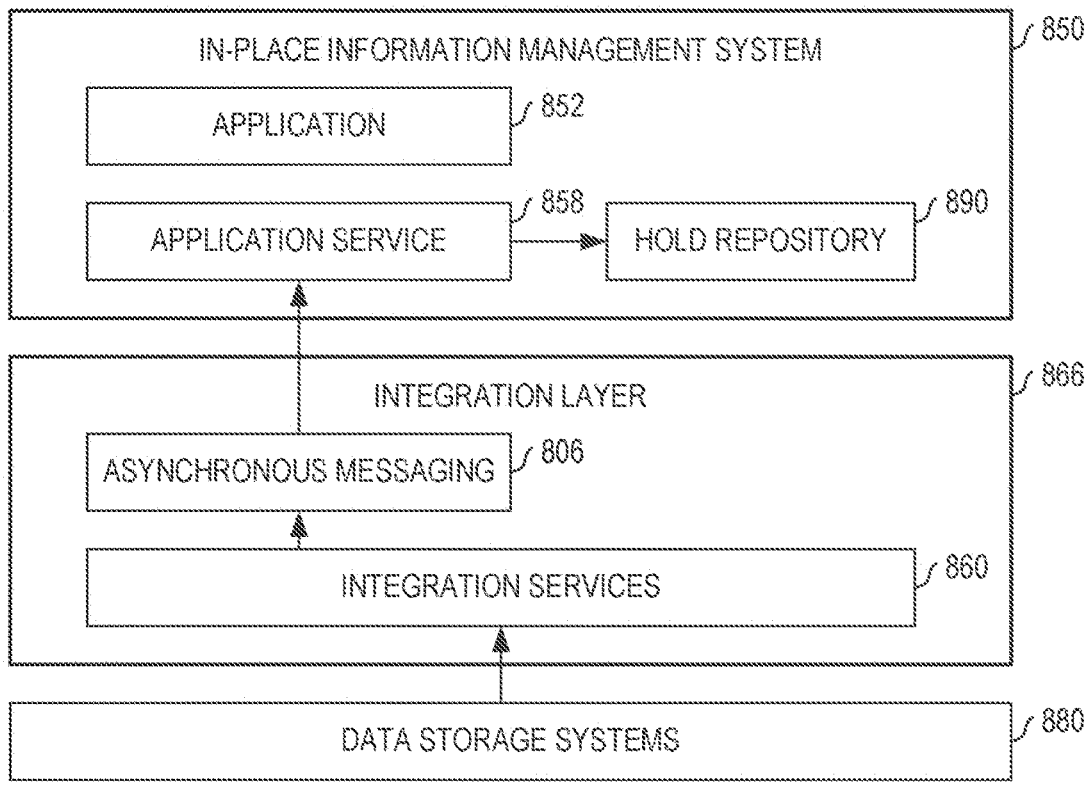
FIG. 8 depicts a diagrammatic representation of an example implementation of one embodiment of an in-place information management system utilizing an integration layer.

FIG. 8 depicts a diagrammatic representation of an example implementation where system 850 having application 852, application service 858, and hold repository 890 communicates with data storage systems 880 via integration layer 866. In this example, integration layer 866 includes asynchronous messaging 806 and integration services 860. Application 852 may be one embodiment of application 552 described above. Application service 858 may be one embodiment of application service 658 described above. Hold repository 890 may be one embodiment of hold repository 790 described above. Asynchronous messaging 806 may be one embodiment of asynchronous messaging 606 described above. Integration services 860 may be one embodiment of integration services 660 described above.

Figure 9:
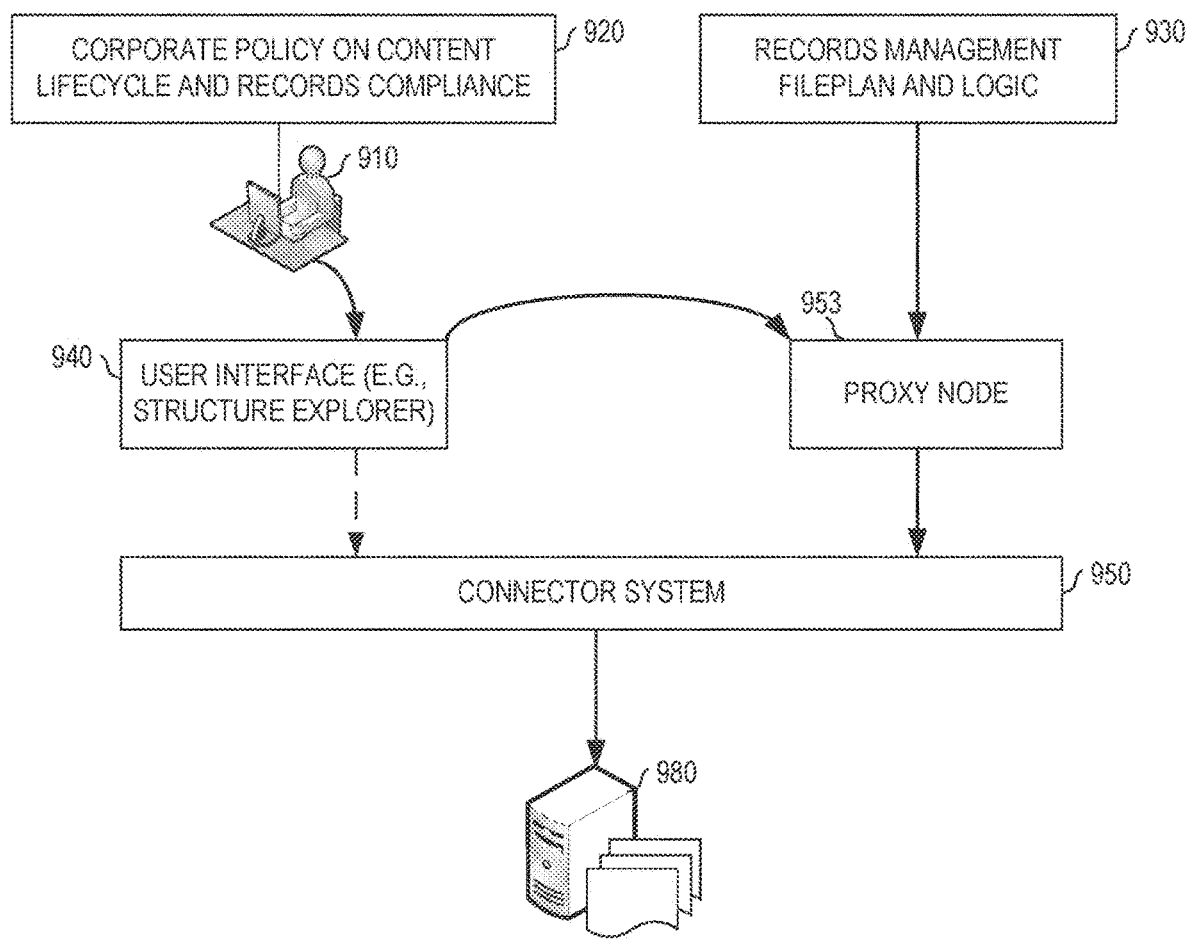
FIG. 9 depicts a diagrammatic representation of an example implementation where a records manager may interact with disparate data storage systems via a user interface of an in-place information management system.

FIG. 9 depicts a diagrammatic representation of an example implementation where the system is connected to data storage system 980 having connector system 950. Data storage system 980 may represent an independent data storage system in which the code cannot be modified, either by necessity or choice. In this case, a records manager (e.g., records manager 910) may determine a class of records per corporate policy on content lifecycle and records compliance (e.g., policy 920). The records manager may utilize a user interface (e.g., structure explorer 940) to define a query for finding a set of records in the class. Since structure explorer 940 uses connector system 950 to explore data storage system 980, structure explorer 940 knows the connector universal resource locator (URL) to use when making a local call to associate the connector URL to a proxy node (e.g., proxy node 953). Those skilled in the art can appreciate programming techniques necessary to make such an association. The records manager may associate the query defining the set of records with the proxy node and manage the set of records defined by the query by applying RM fileplan and logic (e.g., logic 930) to the proxy node which uses the connector URL to manage the set of records "in-place." In this case, a non-limiting example of a query may include parameters such as "User," "Connector Identifier" or "Connector URL" identifying where the query is going, a content management interoperability services (CMIS) query (explained below), and a reply queue identifying where the result will go.

It should be noted that integrating information across such disparate data storage systems can be a synchronous process separate from querying them, which is an asynchronous process according to embodiments disclosed herein. An example of a synchronous information integration process is depicted in a flow diagram of FIG. 10.

Figure 10:
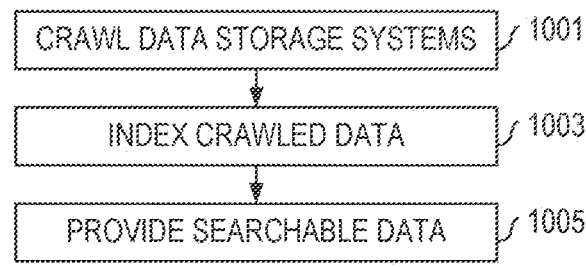
FIG. 10 depicts a flow diagram illustrating an example of a synchronous process for integrating information across disparate data storage systems.

Referring to FIG. 10, at a high level, process 1000 may include crawling various data storage systems to get data for indexing (step 1001), indexing the data thus obtained to build a searchable index (step 1003), and providing indexed, searchable data to a search system (step 1005). This process is further described below with reference to FIGS. 16-18. As a non-limiting example, such a search system may reside at integration layer 866 shown in FIG. 8.

Figure 11:
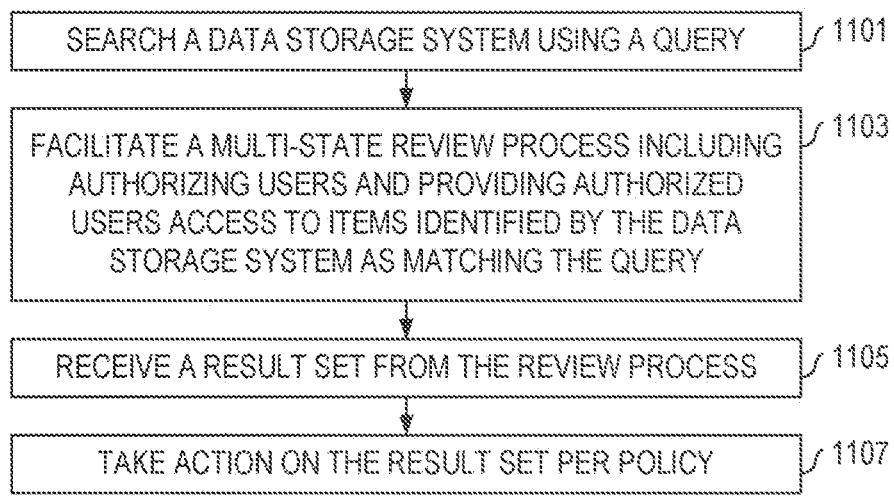
FIG. 11 depicts a flow diagram illustrating one embodiment of an in-place information management method.

FIG. 11 depicts a flow diagram illustrating one embodiment of an in-place information management method. After data residing in disparate data storage systems are searched, the system may search a data storage system using a query defined by a records manager as described above (step 1101). For example, the records manager may define that all items from a source (e.g., a content repository) which match a particular classification and have a particular modification date should be archived. As another example, the records manager may define deletion of all items that have a particular classification and are of a particular type of policy that are from a specific source and have a specific modification date. As part of a review or approval process on a set of records identified by the data storage system as matching the query, the system may authorize certain users and may provide authorized users with access to the set of records so that they can assess and determine what to do with the set of records (step 1103). These users may interact with the system and provide a result set containing record identifier(s) (step 1105). The system may take action on the result set in accordance with a policy and/or some business process (step 1107).

Figure 12:
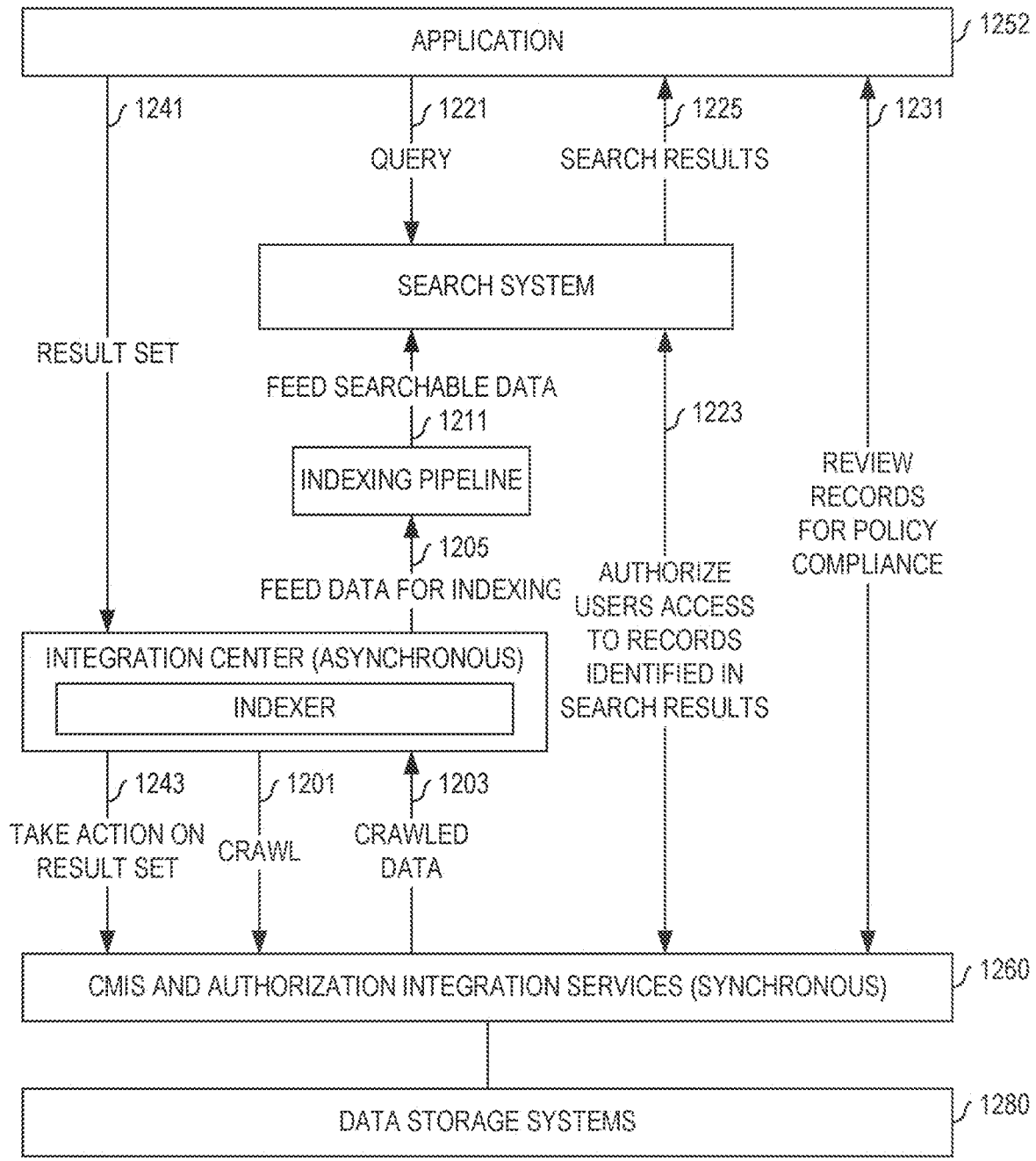
FIG. 12 depicts a flow diagram illustrating another embodiment of an in-place information management method.

FIG. 12 depicts a flow diagram illustrating another embodiment of an in-place information management method. In this case, an indexer may crawl across disparate data storage systems 1280 via CMIS and authorization integration services 1260 (step 1201). Data crawled from data storage systems 1280 (step 1203) may be fed to an indexing pipeline (step 1205). The indexing pipeline may index the crawled data and provide searchable data to a search system (step 1211).

Subsequently, application 1252 may communicate a query to the search system (step 1221). The search system may utilize CMIS and authorization integration services 1260 to run the query and authorize users to review records thus identified (step 1223). The search system may return the search results to application 1252 (step 1225) which, in turn, may communicate the search results identifying the records to the authorized users and interact with the authorized users to receive a result set containing record identifiers (step 1231). Application 1252 may communicate the result set back to the indexer (step 1241) and cause appropriate action to be taken on records identified in the result set via CMIS and authorization integration services 1260 (step 1243).

Figure 13:
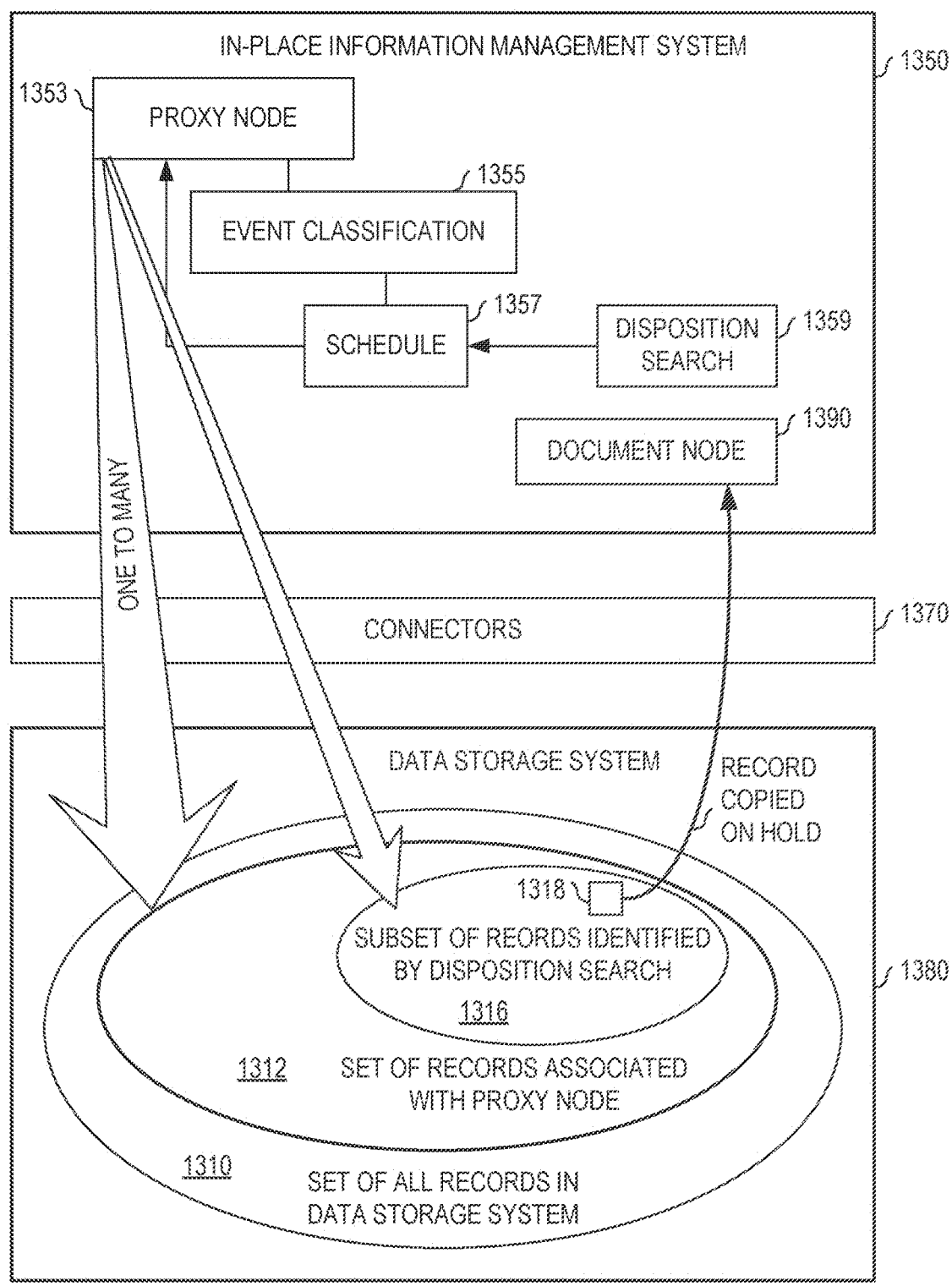
FIG. 13 depicts a diagrammatic representation of another example implementation in which one embodiment of an in-place information management system is connected to disparate data storage systems via connectors.

FIG. 13 depicts a diagrammatic representation of another example implementation where system 1350 is connected to disparate data storage systems (e.g., data storage system 1380) via connectors 1370. Proxy node 1353, event classification 1355, schedule 1357, and disposition search 1359 may be the same or similar to proxy node 583, event classification 555, schedule 557, and disposition search 659 described above. Document node 1390 may represent in a hold repository of system 1350 "copy on hold" record 1318. Record 1318 may be in subset 1316 of records identified by disposition search 1359. Subset 1316 may represent a subset of set 1312 which includes all the records identified by disposition search 1359. Set 1312 includes all the records associated with proxy node 1353 (e.g., belonging to the same RM class). Finally, set 1312 may represent a subset of set 1310 which includes all the records in data storage system 1380.

Figure 14:
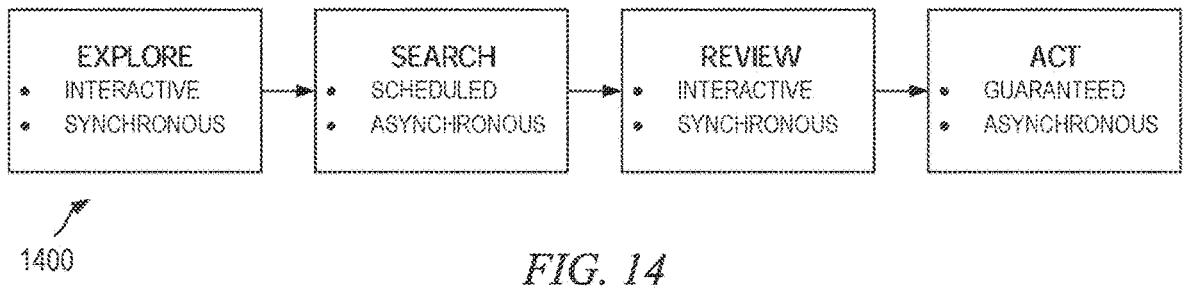
FIG. 14 depicts a diagrammatic representation of an example use of connectors broken down into four stages.

As to connectors 1370, their use can be broken down into four stages depicted in FIG. 14. It can be seen that the "search" and "action" steps are asynchronous. Certain characteristics of these communication steps will now be described.

The search and action steps are asynchronous to support occasionally connected devices. In contrast, the "explore" and "review" steps are done interactively, and so a synchronous model can be the easiest to implement for those steps. The system supports both synchronous and asynchronous calling models. Specifically, the system can send messages to each specific connector, and they will individually respond to the system.

Occasionally connected devices require durable messages. Durable messages are also required to isolate the system from potentially fragile remote systems. If messages are allowed to timeout, then an appropriate error message is sent to the system.

Although the system may be used for informal retention scheduling, its primary value is in compliance with information governance regulations. For In-Place RM this means that the system takes every reasonable effort to ensure that the messages are delivered.

Actions taken on a data storage system are performed as a named user on the data storage system. This requires authentication as the user on the data storage system. In some embodiments, the system may be hosted or implemented on a content server. In such embodiments, the content server can be the only authenticated system capable of sending messages through the asynchronous communication channel. To this end, some form of service authentication can be used. Further, the communication between the content server and the asynchronous communication channel can be encrypted using secured socket layer (SSL) or transport layer security (TLS).

In some cases, the asynchronous messaging may be decoupled from the system and the individual connectors through the use of a message gateway or router. One example of such an implementation is depicted in FIG. 15.

Figure 15:
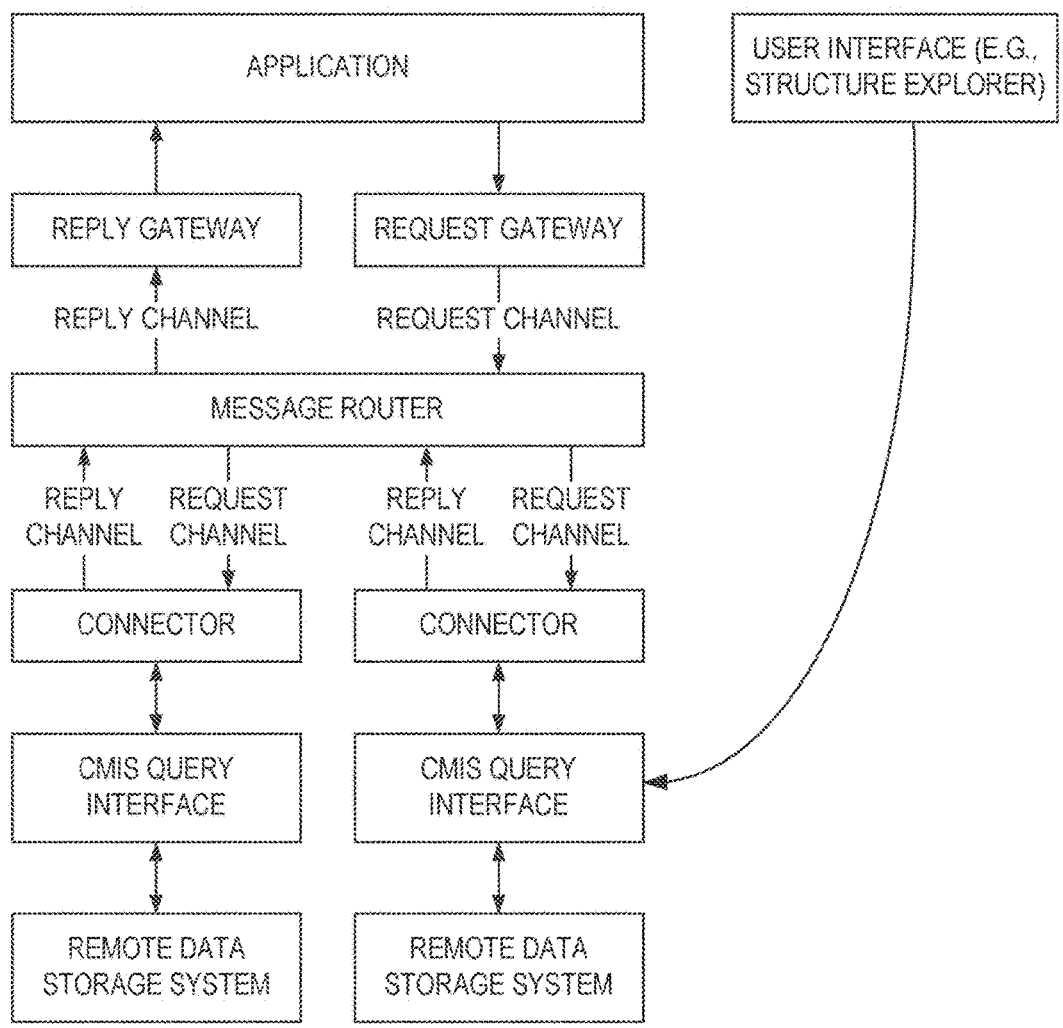
FIG. 15 depicts a diagrammatic representation of another example implementation of an in-place information management system in which a message router is used.

FIG. 15 depicts a diagrammatic representation of another example implementation in which a message router is used to decouple RM application requests from the implementation details in the message router. The message router provides guaranteed message delivery and routes the messages to appropriate connectors. The connectors provide asynchronous request-reply as described above. The CMIS query interfaces provide synchronous data-model translation. As those skilled in the art can appreciate, these components can spread across processes differently depending upon implementation.

At this point, it may be helpful to discuss CMIS in further detail. CMIS refers to an open standard known as Content Management Interoperability Services. CM IS defines an abstraction layer that allows different content management systems to inter-operate over the Internet using web protocols. Specifically, CMIS includes a set of services for adding and retrieving documents and provides a common data model covering typed files and folders with generic properties that can be set or read. This common data model can be based on common architectures of the backend systems. Consequently, CMIS does not define how a backend system can be mapped to the common data model. However, these backend systems may have different expressions of the common data model in which key-value pairs in the common data model may be exposed differently from system to system.

As described above, embodiments may utilize one or more common data models (which can be implemented via an extension of an existing RM application) to communicate between the system's query interface and a remote query interface of a data storage system. Advantageously, this can clearly delineate the responsibility of mapping a query to one or more records stored at one or more data storage systems. Each of such data storage systems can define what it means by a "record date". A records manager need not know how to format queries in order to request records from various data storage systems. The records manager only needs to use one tool (e.g., an existing RM application implemented with an In-Place RM extension) to manage records stored in the various data storage systems. Furthermore, the records manager does not need to know or be concerned with whether a data storage system is currently connected and/or communicating with the system's query interface.

Figure 16:
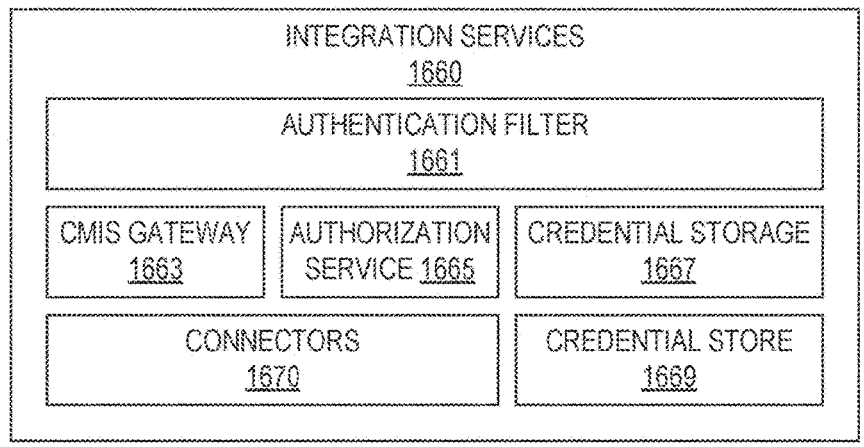
FIG. 16 depicts a diagrammatic representation of one embodiment of integration services.

Rather, an integration layer or integration services may provide the system with synchronous access to disparate data storage systems. One example of such integration services is depicted in FIG. 16. In one embodiment, integration services 1660 may include authentication servlet filter 1661, CMIS gateway 1663, authorization service 1665, credential storage 1667, credential store 1669, and connectors 1670. Those skilled in the art will recognize that integration services 1660 may be implemented in various ways. For example, one or more components of integration services 1660 shown in FIG. 16 may be optional. Furthermore, in some embodiments, integration services 1660 may include one or more components not explicitly shown in FIG. 16.

Authentication servlet filter 1661 can be implemented in various ways. For example, in one embodiment, authentication servlet filter 1661 may implement a single sign-on (SSO) solution. Other access control solutions such as layering Hypertext Transfer Protocol Secure (HTTPS) on top of the SSL/TLS protocol may also be possible. In one embodiment, authentication may be optional.

Suppose a user is authenticated by authentication servlet filter 1661, authorization service 1665 may operate to determine if the user already has a session on a data storage system. This may happen if, for instance, the user already has a session with the data storage system without going through the system. If the user already has a session on the data storage system, integration services 1660 may be provided with a session identifier (ID) which is then stored in credential storage 1667. If the user does not have a session on the data storage system, authorization service 1665 may operate to check credential store 1669 and, if the user is permitted to access the data storage system per information stored in credential store 1669, cause CMIS gateway 1663 to open a session on the data storage system. In this way, CM IS gateway 1663 may decouple the common data model of CMIS from disparate data storage systems at the back end while allowing frontend applications which utilize the CMIS to access content stored in the disparate data storage systems.

Figure 17:
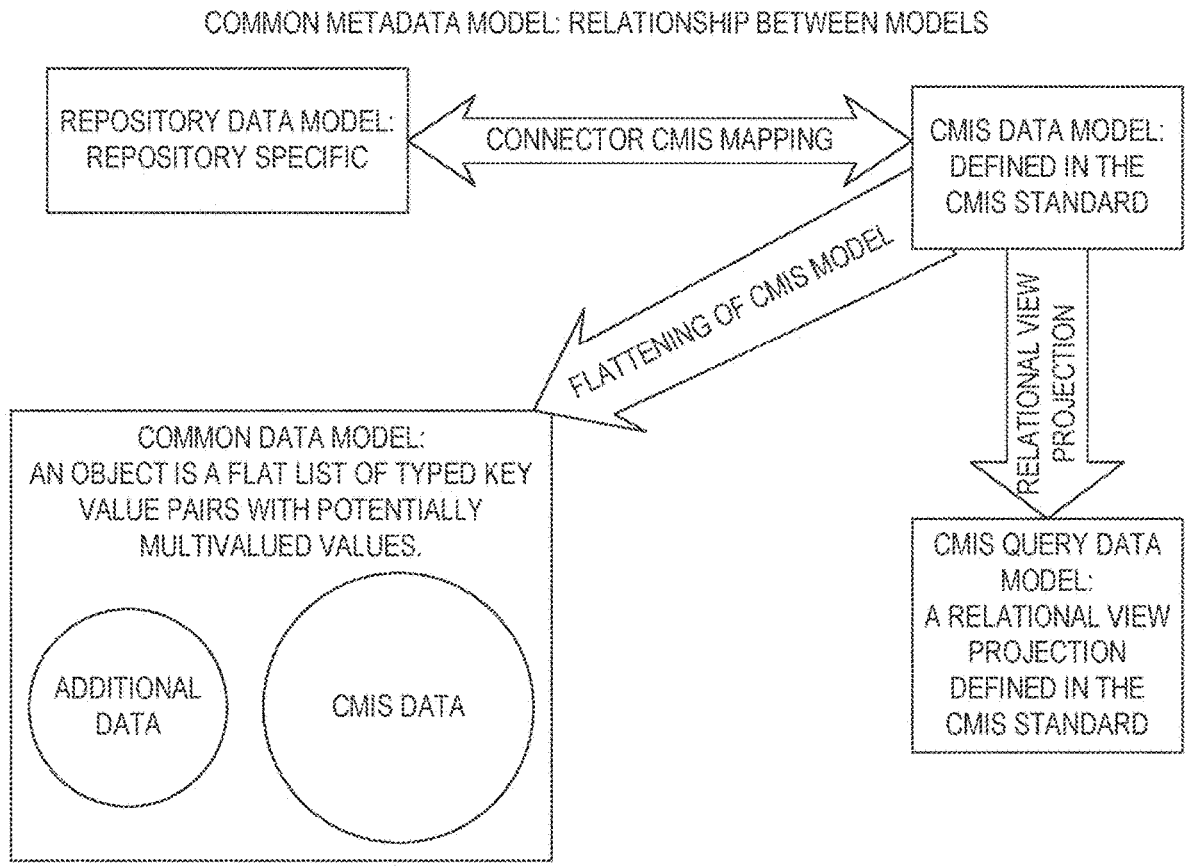
FIG. 17 depicts a diagrammatic example of how various data models can be mapped to a common data model.

FIG. 17 depicts a diagrammatic example of how various data models can be mapped to a common data model. Referring back to FIG. 16, to communicate with a particular data storage system, CMIS gateway 1663 may call one of connectors 1670 configured for or otherwise adapted to the particular data storage system. Each of connectors 1670 may be configured for or otherwise adapted to a data storage system. CMIS gateway 1663 may maintain a CMIS data model defined in the CMIS standard. Connectors 1670 can be configured to map metadata from data storage systems to CMIS conventions.

In some embodiments, integration services 1660 may be configured to provide a two-way translation of a repository data model to the CMIS data model. In some embodiments, this two-way translation can be characterized by: 1) repository objects are unambiguously translated into instances of CMIS types; and 2) instantiation of CMIS types result in unambiguous instantiation of repository objects.

Each connector may be configured with several Java classes, including a type manager class, for interfacing a specific backend system and mapping the data model used by the specific backend system to the common data model used by the CMIS. Some key/value pairs may originate from additional analysis and may not map to instances of data in the CMIS Model. In some embodiments, the data exposed by the CMIS data model may not fully cover the types of data held in a given data storage system. In some embodiments, the data exposed by the CMIS data model may cover a set of data types sufficient for mapping data held in a given data storage system.

In some embodiments, semantically equivalent keys are mapped to the same key name. For example, suppose the CMIS data model employs a key "author" and the data models for various data storage systems employ different attributes or metadata fields such as "author," "author name," "author_name," "AuthorName," "Name_Author," etc. These semantically equivalent keys may all be mapped to "author" and indexed accordingly. Likewise, the CMIS based connectors may map "author," "author name," "author_name," "AuthorName," "Name_Author," etc. to their semantically equivalent key "author" when searching the various data storage systems. Accordingly, when a search is performed to look for documents by a certain author named "John Smith," all documents authored by "John Smith" in the data storage systems may be found, even though different data storage systems may associate this name value "John Smith" with the documents using different attributes or metadata fields.

Example keys of a common data model may include, but are not restricted, to:
DocumentID
Name
Description
Type
Subject
Authors
Created
Modified
CreatedBy
OwnedBy
FileType
MimeType
Size
VersionMajor
VersionMinor
VersionLabel
NumberVersions
FileName In this way, semantically equivalent keys from disparate data storage systems can be mapped to the same key used by the common data model. Aspects of this feature will be further described below with reference to FIG. 18.

Figure 18:
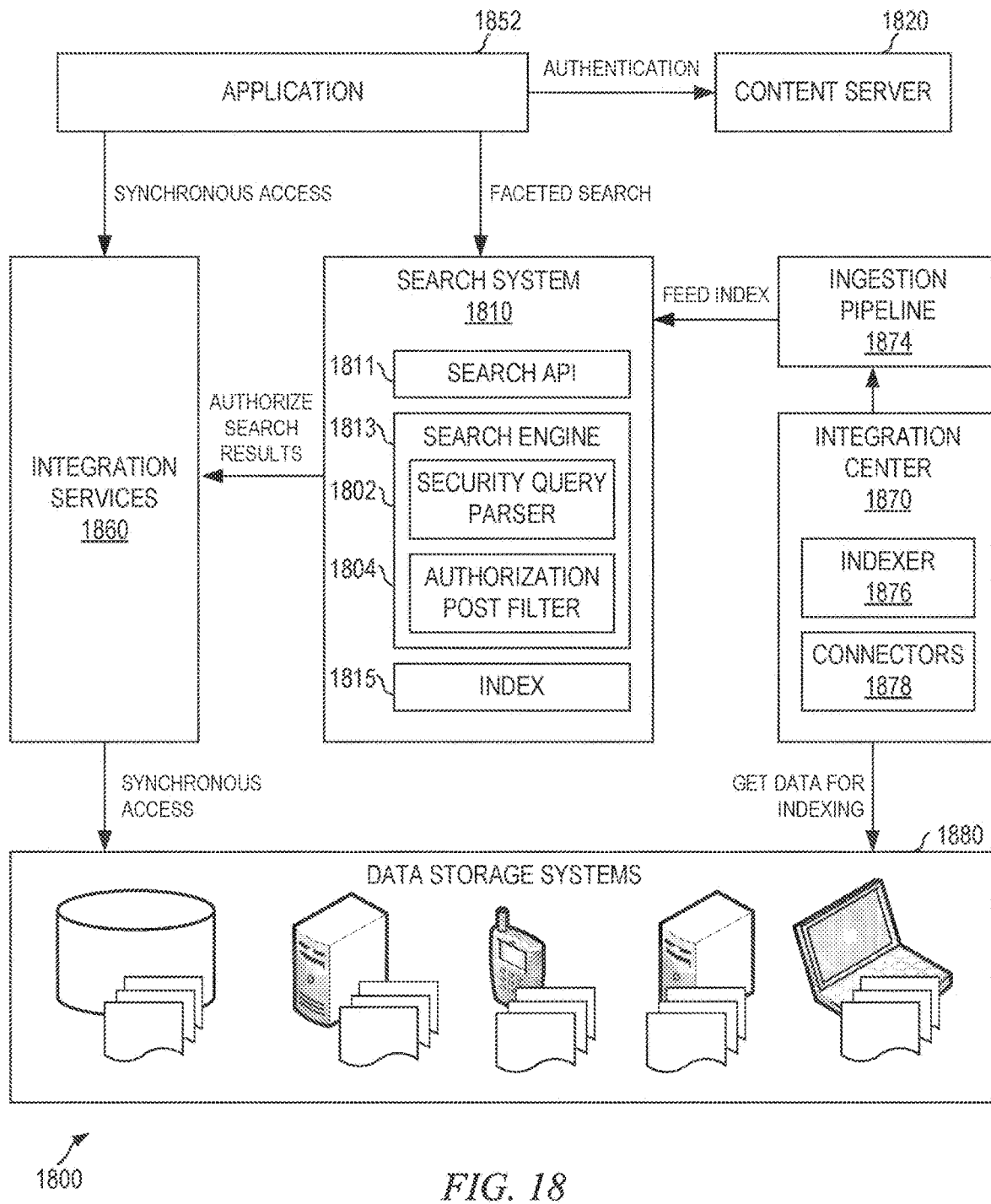
FIG. 18 depicts a diagrammatic representation of an example of an information integration platform.

In the example of FIG. 18, integration services 1860 may include components the same as or similar to those described above with regard to integration services 1660. In this example, information integration platform 1800 may include search system 1810, ingestion pipeline 1874, and integration center 1870 having indexer 1876 and connectors 1878. In this disclosure, indexer 1876 may be a type of a crawler. As is known to those skilled in the art, a crawler or an indexer is a computer program configured for information retrieval. Notice in this case, indexer 1876 may utilize connectors 1878. In some embodiments, connectors 1878 can be the same as, similar to, or different from connectors 1670 described above. For example, in one embodiment, each indexer connector may be particularly configured for a specific backend system such that data mined from the specific backend system can be mapped to the CMIS conventions. In one embodiment, connectors 1878 can be implemented using drivers. Other implementations of indexer 1876 may also be possible.

Ingestion pipeline 1874 may process data retrieved by indexer 1876 through a flow involving several components such as a document extractor, a path processor, a field mapper, a file type normalizer, a detagger, a summarizer, and a cleaner in order to extract data that can be used to build a unified index.

Ingestion pipeline 1874 may feed the crawled data to search system 1810 to build index 1815 which is used by search engine 1813. In one embodiment, search engine 1813 may support faceted search. Faceted search refers to a technique for accessing organized information, combining text search with navigational search using a hierarchy structure. For example, information stored in a repository may be augmented with facets corresponding to properties of data elements such as author, descriptor, format, language, etc.

After installation of integration services 1860 and as soon as search system 1810 begins to build index 1815, application 1852 may, through integrated services 1860, have access to some indexed data. This allows application 1852 to search and synchronize access to data storage systems 1880 even before index 1815 is completely built.

On an ongoing basis, integration center 1870 may be used to synchronize with data storage systems 1880 and keep index 1815 up-to-date. At this point, application 1852 is fully configured. For example, a user may now perform a faceted search utilizing application 1852.

A faceted search module may provide a search application programming interface (API) and a search interface configured to allow a user to enter search text into a text box. As an example, application 1852 may run an instance of a search interface on a client device associated with the user. The user input text is communicated to search system 1810 via search API 1811. Search engine 1813 may determine if the user has sufficient privilege to perform the desired search, parse the user input text to extract entities (or items of information) of interest, search index 1815 to find matches, and return the search results to search API 1811. In one embodiment, these tasks may be performed by security query parser 1802 and authorization post filter 1804. Other implementations of search engine 1813 may also be possible.

Search API 1811 may, in turn, present the search result to the user via the search interface running in application 1852. If application 1852 is hosted on content server 1820, authentication may be needed. The search interface may present the organized search results. For example, the search results may be shown in facets or categories. Each of the categories may be shown with a number of hits (counts). The user can refine the search results by browsing or navigating down a path that begins with one of the categories. Each time a facet is selected, a new search query is automatically generated and passed down through the search interface and search API 1811 to search engine 1813 to begin a new, narrower search. The new search results are returned and presented to the user in a similar manner. This process can be repeated until the user enters a new search query, ends the session, closes application 1852, or otherwise terminates the process.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, at least one read-only memory ("ROM"), at least one random access memory ("RAM"), at least one hard drive ("HD"), and one or more I/O device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used, individually or in conjunction with another programming language, to implement the routines, methods or programs of embodiments of the invention described herein, including C, C++, Java, JavaScript, HTML, or any other programming or scripting language, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can be executed on a single computer processing device or multiple computer processing devices, a single computer processor or multiple computer processors. Data may be stored in a single storage medium or distributed through multiple storage mediums and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. An in-place information management system, comprising:
    a processor;
    an application built on a common data model;
    an integration service;
    connectors for connecting the integration service to a plurality of disparate data storage systems, each connector configured for connecting the integration service to one of the plurality of disparate data storage systems; and
    a non-transitory computer-readable medium storing the application;
    wherein the common data model comprises data fields mapped to semantically equivalent data fields used by the plurality of disparate data storage systems;
    wherein the application, when executed on the processor, sends a query containing searching criteria in a common data model format to the integration service;
    wherein the integration service utilizes the common data model to map the searching criteria to corresponding data fields used by the plurality of disparate data storage systems, queries the plurality of disparate data storage systems using the data fields corresponding to the searching criteria contained in the query, receives information from the plurality of disparate data storage system identifying records stored in the plurality of disparate data storage system that match the searching criteria contained in the query through the corresponding data fields used by the plurality of disparate data storage systems; and sends the information identifying the records to the application; and
    wherein the application, utilizing the information identifying the records, associates the records thus identified with a records management policy.

2. The in-place information management system of claim 1, wherein the application is configured for asynchronous query-based application of policies on content stored in the plurality of disparate data storage systems.

3. The in-place information management system of claim 1, further comprising:
    a user interface for defining the query based on a class of records per the records management policy.

4. The in-place information management system of claim 1, wherein query is associated with a proxy node, wherein the proxy node has a one-to-many relationship with the plurality of disparate data storage systems, and wherein the records associated with the records management policy are managed through the proxy node so that the records are managed in-place, at where the records reside.

5. The in-place information management system of claim 1, wherein each of the connectors is configured for a corresponding one of the plurality of disparate data storage systems.

6. The in-place information management system of claim 1, wherein the integration service is one of a plurality of integration services that runs on an integration layer, wherein the integration layer further comprises asynchronous messaging, and wherein the asynchronous messaging allows a disposition search of a data storage system to continue even if the data storage system slows down or is slow to respond.

7. The in-place information management system of claim 6, wherein the disposition search comprises:
 locating a proxy node based on an event classification, a category, an attribute, or a combination thereof; and
 locating a set of records by executing the query on the data storage system, wherein the set of records is a subset of the records that match the searching criteria contained in the query.

8. A method for in-place information management, the method comprising:
 sending, by an application built on a common data model and executing on a processor, a query containing searching criteria in a common data model format to an integration service, wherein the common data model comprises data fields mapped to semantically equivalent data fields used by a plurality of disparate data storage systems, and wherein the integration service is connected to a plurality of disparate data storage systems via connectors, each connector configured for connecting the integration service to one of the plurality of disparate data storage systems;
 mapping, by the integration service utilizing the common data model, the searching criteria contained in the query to corresponding data fields used by the plurality of disparate data storage systems;
 querying, by the integration service, the plurality of disparate data storage systems using the data fields corresponding to the searching criteria contained in the query;
 receiving, by the integration service, information from the plurality of disparate data storage system identifying records stored in the plurality of disparate data storage system that match the searching criteria contained in the query through the corresponding data fields used by the plurality of disparate data storage systems;
 sending, by the integration service, the information identifying the records to the application;
 associating, by the application utilizing the information identifying the records, the records thus identified with a records management policy; and
 displaying, by the application through a user interface, the information identifying the records.

9. The method according to claim 8, wherein the application is configured for asynchronous query-based application of policies on content stored in the plurality of disparate data storage systems.

10. The method according to claim 8, further comprising:
 providing a structure explorer user interface for defining the query based on a class of records per the records management policy.

11. The method according to claim 8, wherein query is associated with a proxy node, wherein the proxy node has a one-to-many relationship with the plurality of disparate data storage systems, and wherein the records associated with the records management policy are managed through the proxy node so that the records are managed in-place, at where the records reside.

12. The method according to claim 8, wherein each of the connectors is configured for a corresponding one of the plurality of disparate data storage systems.

13. The method according to claim 8, wherein the integration service is one of a plurality of integration services that runs on an integration layer, wherein the integration layer further comprises asynchronous messaging, and wherein the asynchronous messaging allows a disposition search of a data storage system to continue even if the data storage system slows down or is slow to respond.

14. The method according to claim 13, wherein the disposition search comprises:
 locating a proxy node based on an event classification, a category, an attribute, or a combination thereof; and
 locating a set of records by executing the query on the data storage system, wherein the set of records is a subset of the records that match the searching criteria contained in the query.

15. A computer program product for in-place information management, the computer program product comprising a non-transitory computer-readable medium storing instructions translatable by a processor for implementing an integration service and an application built on a common data model, wherein the instructions are translatable by the processor for:
 sending a query containing searching criteria in a common data model format to the integration service, wherein the common data model comprises data fields mapped to semantically equivalent data fields used by a plurality of disparate data storage systems, and wherein the integration service is connected to a plurality of disparate data storage systems via connectors, each connector configured for connecting the integration service to one of the plurality of disparate data storage systems;
 mapping, utilizing the common data model, the searching criteria contained in the query to corresponding data fields used by the plurality of disparate data storage systems;
 querying the plurality of disparate data storage systems using the data fields corresponding to the searching criteria contained in the query;
 receiving information from the plurality of disparate data storage system identifying records stored in the plurality of disparate data storage system that match the searching criteria contained in the query through the corresponding data fields used by the plurality of disparate data storage systems;
 associating, utilizing the information identifying the records, the records thus identified with a records management policy; and
 displaying, through a user interface, the information identifying the records.

16. The computer program product of claim 15, wherein the application is configured for asynchronous query-based application of policies on content stored in the plurality of disparate data storage systems.

17. The computer program product of claim 15, wherein the instructions are further translatable by the processor for:
provide a structure explorer user interface for defining the query based on a class of records per the records management policy.

18. The computer program product of claim 15, wherein query is associated with a proxy node, wherein the proxy node has a one-to-many relationship with the plurality of disparate data storage systems, and wherein the records associated with the records management policy are managed through the proxy node so that the records are managed in-place, at where the records reside.

19. The computer program product of claim 15, wherein the integration service is one of a plurality of integration services that runs on an integration layer, wherein the integration layer further comprises asynchronous messaging, and wherein the asynchronous messaging allows a disposition search of a data storage system to continue even if the data storage system slows down or is slow to respond.

20. The computer program product of claim 19, wherein the disposition search comprises:
locating a proxy node based on an event classification, a category, an attribute, or a combination thereof; and
locating a set of records by executing the query on the data storage system, wherein the set of records is a subset of the records that match the searching criteria contained in the query.

\* \* \* \* \*